United States Patent [19]

Stapleton

[11] Patent Number: 5,687,298
[45] Date of Patent: Nov. 11, 1997

[54] CHORDAL TOLERANCE CONTROL IN CIRCLES ON PEN PLOTTERS FOR INCREASED THROUGHPUT

[75] Inventor: Jeff T. Stapleton, Huntington Beach, Calif.

[73] Assignee: Calcomp, Inc., Anaheim, Calif.

[21] Appl. No.: 54,852

[22] Filed: Apr. 28, 1993

Related U.S. Application Data

[63] Continuation of Ser. No. 706,218, May 28, 1991.

[51] Int. Cl.$^6$ ............................................ G06K 15/00
[52] U.S. Cl. .................................. 395/103; 395/101
[58] Field of Search ............................. 395/101, 102, 395/103, 105, 142, 141, 114; 346/140.1, 139 R; 382/3, 13, 56, 202, 203; 364/167.01, 474.29; 358/260, 447, 461

[56] References Cited

U.S. PATENT DOCUMENTS

| | | | |
|---|---|---|---|
| 4,542,412 | 9/1985 | Fuse et al. | 358/260 |
| 4,654,805 | 3/1987 | Shoup, II | 395/103 |
| 4,809,195 | 2/1989 | Bechet | 395/114 |
| 4,937,632 | 6/1990 | Dalton | 358/461 |
| 4,941,116 | 7/1990 | Hancock et al. | 364/718 |
| 5,224,064 | 6/1993 | Henry et al. | 364/720 |

*Primary Examiner*—Arthur G. Evans
*Attorney, Agent, or Firm*—Michaelson & Wallace; William F. Porter, Jr.

[57] ABSTRACT

This is a method and associated implementation logic for plotting circles with a pen plotter to obtain a substantial and unexpected increase in throughput of the plotter when plotting circles having a radius equal to or smaller than a small radius lower limit. The method comprises the steps of, employing an independently calculated chord length and number of chords at the independently calculated chord length for plotting circles having a radius greater than the small radius lower limit; and, employing a maximum chord length which is not separately discernable to the naked eye in a circle of a desired radius and an associated number of maximum length chords when plotting a circle having a radius equal to or smaller than the small radius lower limit. In tested embodiments, the method has provided a twelve-fold increase in plotter throughput when plotting small radius circles.

6 Claims, 1 Drawing Sheet

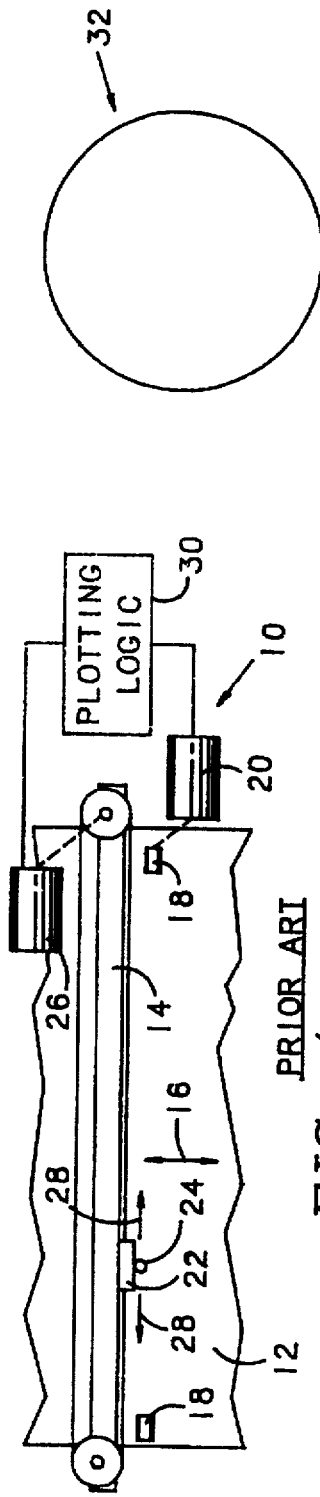
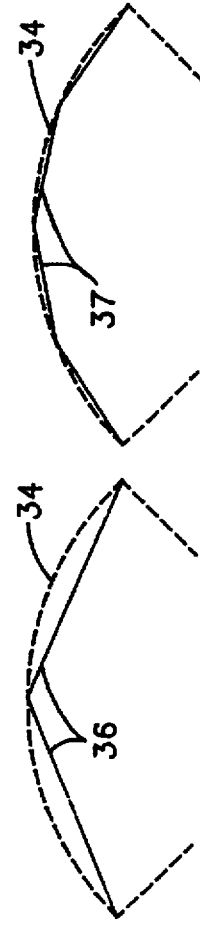
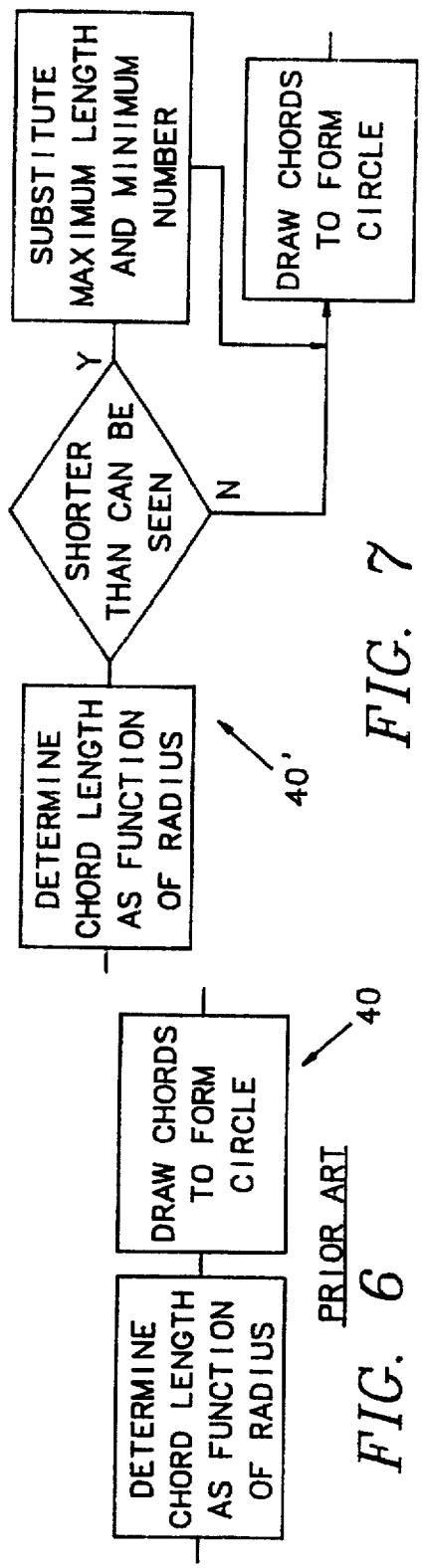
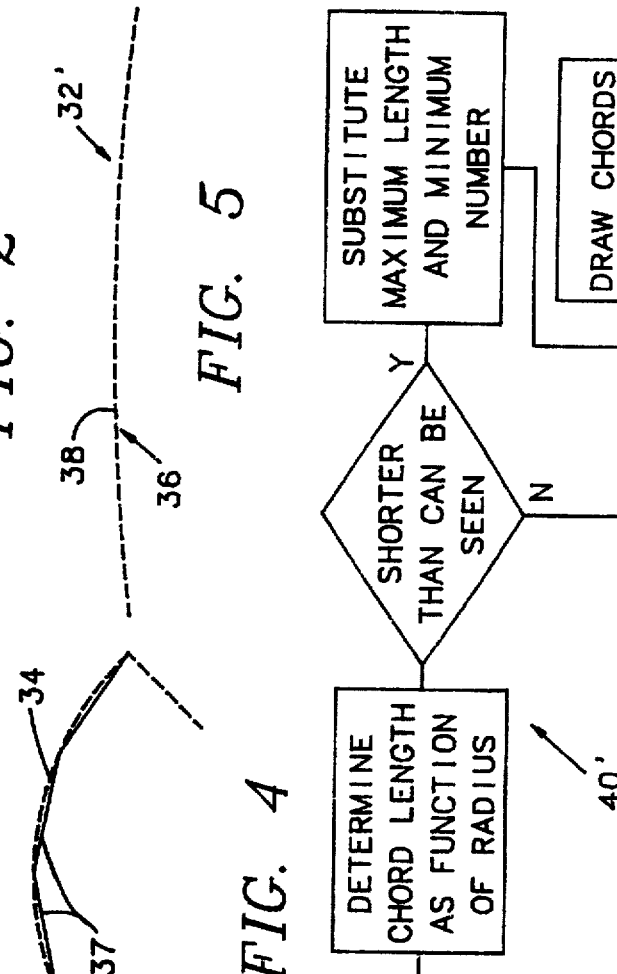

CHORDAL TOLERANCE CONTROL IN CIRCLES ON PEN PLOTTERS FOR INCREASED THROUGHPUT

This is a continuation of application Ser. No. 07/706,218 filed May 28, 1991.

BACKGROUND OF THE INVENTION

The present invention relates to pen plotters and, more particularly, to a method and associated implementation logic for plotting circles with a pen plotter to obtain a substantial and unexpected increase in throughput of the plotter when plotting circles having a radius equal to, or smaller than a small radius lower limit. The method comprises the steps of, employing an independently calculated chord length and number of chords at the independently calculated chord length for plotting circles having a radius greater than the small radius lower limit; and, employing a maximum chord length which is not discernable to a naked eye in a circle of a desired radius and an associated number of maximum length chords when plotting a circle having a radius equal to or smaller than the small radius lower limit.

Pen plotters such as that depicted in simplified form in FIG. 1 are quite popular as peripheral devices for computer users in applications like CAD/CAM and the like as they are generally quite swift and accurate on the one hand while being less expensive than other types of plotting devices. In such a plotter 10 a sheet of printing media 12 is moved under a beam 14 as indicated by the arrow 16 by the pinch rollers 18 and motor 20 to effect movement in one direction of an X-Y coordinate system while, a printhead 22 carrying a pen 24 is moved orthogonally across the beam 14 and media 12 by a motor 26 to effect movement in the other direction of the X-Y coordinate system as indicate d by the arrows 28. The bidirectional movement of the motors 20, 26 is controlled by the plotting logic 30. The motors 20, 26 have a movement accuracy which is finite. Typically, they move in steps of 0.001 inch in a standard professional quality plotter. Thus, any curve that is plotted is comprised of a series of straight lines of a length determined by the movement accuracy of the motors 20, 26. The accuracy of the plotter 10 is given as a function of the motor accuracy or smallest straight line steps that it can produce. A curve produced from straight line steps of 0.001 inch is generally quite smooth looking to the naked-eye and an. observer not knowing any different would think that it is a smoothly-curved line. In a plotter having 0.005 inch accuracy, on the other hand, the curve exhibits to the naked eye what is often referred to as "the jaggies", i.e. a readily-recognizable, .i.e. separately visible, series of short lines comprising the "curve".

In prior art plotting logic like the plotting logic 30 of FIG. 1, a circle such as that indicated as 32 in FIG. 2 is not plotted with minimal length steps or lines in each case. To do so would waste plotting time and reduce the throughput of the plotter 10. As shown in FIGS. 3 and 4, an arc 34 of a circle can be plotted as a series of chords 36 which will appear smoothly curved. As can be seen, the chords 36 comprising the arc 34 of FIG. 3 are too long and too few in number so that the curve of the arc 34 is definitely seen to be comprised of straight lines. The chords 37 of the arc 34 of FIG. 4, on the other hand, clearly are approaching an apparent smoothness of curve. Thus, the typical prior art plotting logic 30 driving the motors 20, 26 is set to plot circles such as 32 of FIG. 2 as a series of chords 36 which are of a length and number per arc length in radians which is a function of the radius of the circle. While the discussion herein is primarily directed to circles, those skilled in the art will recognize and appreciate that the same problem exists with ellipses since their major and minor axes are determined and a circle is simply a special ellipse in which the major and minor axes are identical and comprise the radius. Since circles are plotted with a far greater frequency than ellipses, however, the benefits of the present invention are primarily derived from its implementation in the plotting of circles. In keeping with the scope and spirit of the invention, however, the use of the word "circle" or "circular arc" in the description which follows or in the appended claims should not be held to be limiting in nature.

For ease and speed of implementation, the prior art plotting logic 40 for circle plotting typically determines the chord s length and number of chords as depicted in the flowchart of FIG. 6 by calculating these factors as a function of the, radius. In general, this works adequately and circles 32 are plotted as a series of straight-line chords 36 which are smooth in appearance so as to be acceptable to the user and viewer. The problem exist in through-put of the plotter when plotting small radius circles. The phenomenon is depicted in FIG. 5. Because of the prior art approach to determining chord length and number, a small radius circle 32' is comprised of, in effect, a series of dots 38 which are actually chords 36 of the minimum step length of the motors 20, 26. The result is a, serious loss of throughput of the plotter 10 while it plots the numerous chord-"dots" 38—which are totally unnecessary to convey a smooth circle to the naked eye at the given radius.

Wherefore, it is the object of the present invention to provide an improvement to plotting logic for pen plotters when plotting circles and circular arcs which will improve throughput of the plotter for small radius circles by only employing the shortest length and number of chords necessary for the naked eye of a viewer to perceive a smoothly curving line.

Other objects and benefits of the invention will become apparent from the detailed description which follows hereinafter when taken in conjunction with the drawing figures which accompany it.

SUMMARY

The foregoing object has been achieved in the plotting of circles with a pen plotter by the method of the present invention for chord length and number determination to maximize throughput of the plotter when plotting circles having a radius equal to or smaller than a small radius lower limit wherein an independently calculated chord length for a circle of the small radius lower limit is less than the minimum chord length which is separately discernable to a naked eye in a circle of that radius comprising the steps of, employing the independently calculated chord length and number of chords at the independently calculated chord length for plotting circles having a radius greater than the small radius lower limit; and, employing the maximum chord length which is not discernable to the naked eye and an associated number of maximum length chords when plotting a circle having a radius equal to or smaller than the small radius lower limit.

DESCRIPTION OF THE DRAWINGS

FIG. 1 is a simplified drawing of a prior art pen plotter as wherein the present invention can be implemented to advantage.

FIG. 2 is a drawing of a plotted circle.

FIG. 3 is an enlarged drawing of an arc of a plotted circle showing how it is made up of straight line chords.

FIG. 4 is an enlarged drawing of an arc of a plotted circle in the manner of FIG. 3 showing how it is made up of greater number of straight line chords.

FIG. 5 is a greatly enlarged drawing of an arc of a plotted circle in the manner of FIGS. 3 and 4 showing how it is made up of an even greater number of very short straight line chords approaching a series of dots.

FIG. 6 is a flowchart depicting the prior art approach to chordal length and number determination when plotting circles.

FIG. 7 is a flowchart depicting the approach and method of the present invention to chordal length and number determination when plotting circles.

DESCRIPTION OF THE PREFERRED EMBODIMENT

The circle plotting logic 40' of the present invention to be inserted into the plotting logic 30 to replace the prior art circle plotting logic 40 of FIG. 6 is shown in FIG. 7. While at first inspection it appears to be simple and straightforward, no one to date has thought to implement the approach of the present invention as set forth in FIG. 7. Despite its simple approach, the results thereof in throughput improvement as demonstrated by tested embodiments is clearly in the totally unexpected improvement and benefit category. In other words, those skilled in the art simply did not perceive the tremendous benefit which could be achieve from the approach of the present invention and, if they considered it at all, simply discounted it out of hand as an unnecessary additional step to be included within the plotting logic being implemented. Contrary to what is evidentially the generally held belief by those skilled in the art in this regard, however, and as recognized by the applicant herein, a pen plotter of the assignee of this application reduced the plotting time for small circles from 3.0 seconds to 0.25 seconds simply by changing to the method of this invention as described by the flowchart of FIG. 7. That is a reduction to one-twelfth the prior time. That means that the throughput of the pen plotter employing the present invention when plotting small circles is twelve times faster than the same plotter without the present invention.

As shown in FIG. 7, the circle plotting logic 40' of this invention first determines a proposed chord length and number of chords as a function of the radius generally as in the prior art. Instead of simply using the values as in the prior art, however, the logic 40' of this invention next compares the indicated chord length to a minimum chord length that can be distinguished by the naked eye. This value is, of course, readily known or easily determined by those skilled in the art without undue experimentation. If the determined chord length is not too short to be distinguished, it is employed in the usual manner. In this case, the circle is outside of the "small circle" category which benefits from the present invention. If the determined chord length is too short to be distinguished, however, the maximum possible chord length which is not discernable to the naked eye and an associated number of chords for the radius of the circle (or circular arc) are substituted. Thus, for very small circles, the "circle" may actually comprise a square or even a triangle if it will appear as a circle to the naked eye.

In the tested embodiment, this comparison and substitution, if necessary, is accomplished in a firmware look-up table which stores, for every chord value, the maximum nondiscernable chord length. Thus, the logic 40' can quickly determine the proper chord length to employ for a given circle to maximize throughput.

Wherefore, having thus described the present invention, what is claimed is:

1. In a pen plotter including circle plotting logic which determines a length and number of chords to employ in plotting circular arcs wherein said determined length of the chord is not necessarily the longest possible which would still be separately indiscernible by a naked eye from adjacent chords in the circular arc and from a theoretical circular arc which said chord represents, the improvement to maximize throughput of the plotter in plotting circular arcs comprising:
   a) a look-up table which electronically stores for a particular circular arc radius a maximum length of a chord which is separately indiscernible by the naked eye from adjacent chords in the circular arc and from a theoretical circular arc which said chord represents; and,
   b) logic within the circle plotting logic for comparing said determined length of a chord to be employed in plotting a circular arc having a particular radius to said maximum length chord associated with said radius of the circular arc obtained from the look-up table, and for subsituting said maximum length chord and determining an associated number of said maximum length chords to be employed to plot the circular arc if said determined length of the chord is shorter than said maximum length chord.

2. In a pen plotter including circle plotting logic which determines a length and number of chords to employ in plotting circles wherein said determined length of the chord is not necessarily the longest possible which would still be separately indiscernible by a naked eye from adjacent chords in the circle and from a theoretical circular arc which said chord represents, the improvement to maximize throughput of the plotter in plotting circles comprising:
   a) a look-up table which electronically stores for a particular circle radius a maximum length of a chord which is separately indiscernible by the naked eye from adjacent chords in the circle and from a theoretical circular arc which said chord represents; and,
   b) logic within the circle plotting logic for comparing said determined length of a chord to be employed in plotting a circle having a particular radius to said maximum length chord associated with said radius of the circular arc obtained from the look-up table, and for substituting said maximum length chord and determining an associated number of said maximum length chords to be employed to plot the circle if said determined length of the chord is shorter than said maximum length chord.

3. In a pen plotter including circle plotting logic which determines a length and number of chords to employ in plotting circles wherein said determined length of the chord is not necessarily the longest possible which would still be separately indiscernible by a naked eye from adjacent chords in the circle and from a theoretical circular arc which said chord represents, the method of chord length and number determination to maximize throughput of the plotter when plotting circles comprising the steps of:
   a) first determining the length of a chord to be employed in plotting a circle having a particular radius;
   b) then comparing the determined chord length to a maximum chord length obtained from a look-up table resident in the pen plotter which electronically stores for a particular circle radius a maximum chord length which is separately indiscernible by the naked eye from adjacent chords in the circle and from a theoretical circular arc which said chord represents;
   c) substituting said maximum chord length if said determined chord length is shorter than said maximum chord length; and, d) determining an associated number of said maximum chord lengths to be employed to plot the circle.

4. In the plotting of circles with a pen plotter, the method of chord length and number determination to maximize throughput of the plotter when plotting circles:
   a) first determining the length of a chord to be employed in plotting a circle having a particular radius wherein the determined length of the chord is not necessarily the longest possible which would still be separately indiscernible by a naked eye from adjacent chords in the circle and from; a theoretical circular arc which said choed represents;
   b) then comparing the determined chord length to a maximum chord length obtained from a look-up table resident in the pen plotter which electronically stores for a particular circle radius a maximum chord length which is separately indiscernible by the naked eye from adjacent chords in the circle and from a theoretical circular arc which said chord represents;
   c) substituting said maximum chord length if said determined chord length is shorter than said maximum chord length; and,
   d) determining an associated number of said maximum chord lengths to be employed to plot the circle.

5. In the plotting of circles with a pen plotter, the method of chord length and number determination to maximize throughput of the plotter when plotting circles having a radius equal to or smaller than a small radius lower limit wherein an independently calculated chord length for a circle of the small radius lower limit is less than a maximum chord length, said maximum chord length being obtainable from a look-up table resident in the pen plotter which electronically stores for a particular circle radius equal to or smaller than a small radius lower limit, a maximum chord length which is separately indiscernible to a naked eye in a circle of that radius, comprising the steps of:
   a) employing the independently calculated chord length and number of chords at the independently calculated chord length for plotting circles having a radius greater than the small radius lower limit; and,
   b) employing the maximum chord length obtained from the look-up table which is associated with the radius of a circle being plotted when said circle has a radius equal to or smaller than the small radius lower limit, and determining an associated number of said maximum chord lengths to be employed to plot the circle.

6. A method of plotting circles with a pen plotter to maximize throughput of the plotter when plotting circles having a radius equal to or smaller than a small radius lower limit comprising the steps of:
   a) employing an independently calculated chord length and number of chords at the independently calculated chord length for plotting circles having a radius greater than the small radius lower limit; and,
   b) employing a maximum chord length obtained from a look-up table resident in the pen plotter, wherein said look-up table electronically stores for a particular circle radius equal to or smaller than a small radius lower limit a maximum chord length which is separately indiscernible to a naked eye in a circle of that radius when plotting a circle having a radius equal to or smaller than the small radius lower limit and determining an associated number of said maximum chord lengths to be employed to plot the circle.

* * * * *